US006228787B1

(12) United States Patent
Pavel

(10) Patent No.: US 6,228,787 B1
(45) Date of Patent: *May 8, 2001

(54) FLUORESCENT PHOTOSENSITIVE GLASSES AND PROCESS FOR THE PRODUCTION THEREOF

(76) Inventor: Eugen Pavel, Bucharest (RO)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/123,131

(22) Filed: Jul. 27, 1998

(51) Int. Cl.[7] ................................. C03C 4/12; C03C 4/04
(52) U.S. Cl. ............. 501/13; 252/301.4 R; 252/301.4 F; 252/301.4 P; 501/64; 501/73; 501/45
(58) Field of Search .................................. 501/13, 64, 45, 501/73; 282/301.4 R, 301.4 F, 301.4 P

(56) References Cited

U.S. PATENT DOCUMENTS

| 2,326,012 | 8/1943 | Dalton ........................................ 95/5 |
|---|---|---|
| 2,422,472 | 6/1947 | Dalton ...................................... 49/92 |
| 2,515,937 | 7/1950 | Stookey .................................... 49/92 |
| 2,651,145 | 9/1953 | Stookey .................................... 49/88 |
| 3,549,554 | 12/1970 | Hirayama et al. ................. 252/301.6 |
| 3,727,150 | * 4/1973 | Robinson et al. ............. 252/301.4 F |
| 3,846,142 | 11/1974 | Buzhinsky et al. ................. 106/47 R |
| 3,979,322 | * 9/1976 | Alexeev et al. ................. 252/301.4 P |
| 4,075,120 | 2/1978 | Myers et al. .................... 252/301.4 P |
| 4,076,541 | 2/1978 | Rapp .................................. 106/47 Q |
| 4,219,704 | 8/1980 | Russell .......................... 179/100.3 B |
| 4,288,861 | 9/1981 | Swainson et al. .................... 365/127 |
| 4,458,345 | 7/1984 | Bjorklund et al. .................... 369/103 |
| 4,839,092 | 6/1989 | Lindmayer .................... 252/301.4 S |
| 4,927,681 | 5/1990 | Chikuma .............................. 428/64 |
| 4,962,067 | * 10/1990 | Myers .......................... 252/301.4 P |
| 5,163,039 | 11/1992 | Lindmayer ........................... 369/100 |
| 5,182,669 | 1/1993 | Chikuma et al. ..................... 359/241 |
| 5,191,574 | 3/1993 | Henshaw et al. ..................... 369/100 |
| 5,212,120 | 5/1993 | Araujo et al. ........................... 501/13 |
| 5,253,198 | 10/1993 | Birge et al. .......................... 365/106 |
| 5,278,816 | 1/1994 | Russell .................................. 369/100 |
| 5,325,324 | 6/1994 | Rentzepis ............................. 365/127 |
| 5,399,451 | 3/1995 | Hashida et al. ....................... 430/19 |
| 5,502,706 | 3/1996 | Yang et al. ........................... 369/100 |
| 5,532,104 | 7/1996 | Goto .................................... 430/139 |
| 5,568,460 | 10/1996 | Saikan et al. ........................ 369/100 |
| 5,754,511 | 5/1998 | Gemma et al. ....................... 369/100 |

FOREIGN PATENT DOCUMENTS

| 199 409 A1 | 10/1986 | (EP) . |
|---|---|---|
| 356 746 A2 | 3/1990 | (EP) . |
| 396 943 A2 | 11/1990 | (EP) . |
| 534 045 A1 | 3/1993 | (EP) . |
| 640 571 A1 | 3/1995 | (EP) . |
| 709 345 A1 | 5/1996 | (EP) . |
| WO 91/07651 | 5/1991 | (WO) . |
| WO 93/02454 | 2/1993 | (WO) . |
| WO 95/16994 | 6/1995 | (WO) . |
| WO 96/34394 | 10/1996 | (WO) . |
| WO 97/13251 | 4/1997 | (WO) . |
| WO 98/25262 | 6/1998 | (WO) . |

OTHER PUBLICATIONS

Stookey, S.D., "Photosensitive Glass," *Industrial and Engineering Chemistry*, vol. 41, No. 4, pp. 856–861 (Apr. 1949).
Stookey, S.D., "Catalyzed Crystallization of Glass in Theory and Practice," *Industrial and Engineering Chemistry*, vol. 51, No. 7, pp. 805–808 (Jul. 1959).
Kirk, J.P., "Hologram on Photochromic Glass," *Applied Optics*, vol. 5, No. 10, pp. 1684–1685 (Oct. 1966).
Bosomworth, D.R. et al., "Thick Holograms In Photochromic Materials," *Applied Optics*, vol. 7, No. 1, pp. 95–98 (Jan. 1968).
Auzel, F. et al., "Rare Earth Doped Vitroceramics: New, Efficient, Blue and Green Emitting Materials for Infrared Up–Conversion," *J. Electrochem. Soc.: Solid–State Science And Technology*, vol. 122, No. 1, pp. 101–107 (Jan. 1975).
Stookey, S.D. et al., "Full–color photosensitive glass," *J. Appl. Phys.*, vol. 49, No. 10, pp. 5114–5123 (Oct. 1978).
Parthenopoulos, D.A. et al., "Three–Dimensional Optical Storage Memory," *Science*, vol. 245, No. 4920, pp. 843–845 (Aug. 25, 1989).
Jutamulia, S. et al., "Erasable optical 3D memory using novel electron trapping (ET) materials," *SPIE Optical Data Storage Technologies*, vol. 1401, pp. 113–118 (1990), No Month.
Hunter, S. et al., "Potentials of two–photon based 3–D optical memories for high performance computing," *Applied Optics*, vol. 29, No. 14, pp. 2058–2066 (May 10, 1990).
Trotter, D.M., Jr., "Photochromic and Photosensitive Glass," *Scientific American*, pp. 124–129 (Apr. 1991).
Strickler, J.H. et al., "Three–dimensional optical data storage in refractive media by two–photon point excitation," *Optics Letters*, vol. 16, No. 22, pp. 1780–1782 (Nov. 15, 1991).
Doan, V. V. et al., "Luminescent Color Image Generation on Porous Silicon," *Science*, vol. 256, No. 5065, pp. 1791–1792 (Jun. 26, 1992).

(List continued on next page.)

Primary Examiner—C. Melissa Koslow
(74) Attorney, Agent, or Firm—Herbert Dubno

(57) ABSTRACT

This invention relates to fluorescent photosensitive glasses and a process for the production thereof. The fluorescent photosensitive glasses according to the present invention employ silicate or phosphate glass compositions including minor amounts of one or more fluorescent agents (e.g., ytterbium (Yb), samarium (Sm), europium (Eu)) and one or more photosensitive agents (e.g., erbium (Er), thulium (Tm), praseodymium (Pr), ytterbium (Yb), holmium (Ho), samarium (Sm), cerium (Ce), dysprosium (Dy), terbium (Tb), neodymium (Nd)). The inventive fluorescent photosensitive glass can be used in photographic applications, florescent displays and computer memories.

5 Claims, No Drawings

OTHER PUBLICATIONS

Nie, S. et al., "Probing Individual Molecules with Confocal Fluorescene Microscopy," *Science*, Vol. 266, No. 5187, pp. 1018–1021 (Nov. 11, 1994).

Psaltis, D. et al., "Holographic Memories," *Scientific American*, vol. 273, No. 5, pp. 70–76 (Nov. 1995).

The Confocal System LEICA TCS NT, Leica Microscopy and Scientic Instruments Group, Heerbrugg, Switzerland (1996), No Month.

D. von der Linde et al., "Breakdown threshold and plasma formation in femtosecond laser–solid interaction," *J. Opt. Soc. Am. B.*, vol. 13, No. 1, pp. 216–222 (Jan. 1996).

Neifeld, M.A. et al., "Optical memory: introduction by the feature editors," *Applied Optics*, vol. 35, No. 14, p. 2345 (May 10, 1996).

Ueki, H. et al., "Three–dimensional optical bit–memory recording and reading with a photorefractive crystal: analysis and experiment," *Applied Optics*, vol. 35, No. 14, pp. 2457–2465 (May 10, 1996).

König, K. et al., "Cell damage in near–infrared multimode optical traps as a result of multiphoton absorption," *Optics Letters*, vol. 21, No. 14, pp. 1090–1092 (Jul. 15, 1996).

Piyaket, R. et al., "Two–photon–induced photochromic reactions in spirobenzopyran–doped poly(methyl methacrylate) thin–film waveguides," *Optics Letters*, vol. 21, No. 14, pp. 1032–1034 (Jul. 15, 1996).

Dvornikov, A.S. et al., "Molecular transformation as a means for 3D optical memory devices," *Optics Communications*, vol. 128, No, 4–6, pp. 205–210 (Jul. 15, 1996).

Bernal, M–P. et al., "Holographic–Data–Storage Materials," *MRS Bulletin*, vol. 21, No. 9, pp. 51–60 (Sep. 1996).

Davis, K.M. et al., "Writing waveguides in glass with a femtosecond laser," *Optics Letters*, vol. 21, No. 21, pp. 1729–1731 (Nov. 1, 1996).

Shen, X.A. et al., "Experimental demonstration of impulse-–equivalent time–domain optical memory," *Optics Letters*, vol. 21, No. 24, pp. 2020–2022 (Dec. 15, 1996).

Glezer, E.N. et al., "Three–dimensional optical storage inside transparent materials," *Optic Letters*, vol. 21, No. 24, pp. 2023–2025 (Dec. 15, 1996).

Moscovitch, M. et al., "Simulation of radiation effects on three–dimensional computer optical memories," *J. Appl. Phys.*, vol. 81, No. 1, pp. 58–69 (Jan. 1, 1997).

Maruo, S. et al., "Three–dimensioanl microfabrication with two–photon–absorbed photopolymerization," *Optics Letters*, vol. 22, No. 2, pp. 132–134 (Jan. 15, 1997).

König, K., "Cellular response to near–infrared femtosecond laser pulses in two–photon microscopes," *Optics Letters*, vol. 22, No. 2, pp. 135–136 (Jan. 15, 1997).

Ha, T. et al., "Single molecule spectroscopy with automated positioning," *Appl. Phys. Lett.*, vol. 70, No. 6, pp. 782–784 (Feb. 10, 1997).

Dianov, E.M. et al., "Refractive–index gratings written by near–ultraviolet radiation," *Optics Letters*, vol. 22, No. 4, pp. 221–223 (Feb. 15, 1997).

Dvornikov, A.S. et al., "Novel organic ROM materials for optical 3D memory devices," *Optics Communications*, vol. 136, Nos. 1, 2, pp. 1–6 (Mar. 1, 1997).

Kikuchi, S. et al., "Three–dimensional image reconstruction for biological micro–specimens using a double axis fluorescence microscope," *Optics Communications*, vol. 138, No. 1–3, pp. 21–26 (May 15, 1997).

Pavel, E. et al., "Fluorescent Photosensitive Glass—A Novel Material for Optical Memory and Fluorescence Holography," *Journal of Solid State Chemistry*, vol. 134, pp. 362–363 (Jul. 29, 1997).

"Packing Density Reaches 1 Tb/in$^2$ in the 2010s," *Optoelectronic Industry and Technology Development Association (OITDA) Newsletter*, No. 4 (Jan. 30, 1998).

Andersen, G. et al., "Holographically corrected microscope with a large working distance," *Applied Optics*, vol. 37, No. 10, pp. 1849–1853 (Apr. 1, 1998).

Hogenboom, D.O. et al., "Three–dimensional images generated by quadrature interferometry," *Optics Letters*, vol. 23, No. 10, pp. 783–785 (May 15, 1998).

Tomov, I.V. et al., "Pulse broadening in femtosecond x–ray diffraction," *Journal of Applied Physics*, vol. 83, No. 10, pp. 5546–5548 (May 15, 1998).

Kawata, Y. et al., "Use of two–photon absorption in a photo–refractive crystal for three–dimensional optical memory," *Optics Letters*, vol. 23, No. 10, pp. 756–758 (May 15, 1998).

Pavel, E. et al., "Three–dimensional memory effect in fluorescent photosensitive glass activated by europium and cerium," *Optics Letters*, vol. 23, No. 16, pp. 1–3 (Aug. 15, 1998).

* cited by examiner

FLUORESCENT PHOTOSENSITIVE GLASSES AND PROCESS FOR THE PRODUCTION THEREOF

FIELD OF THE INVENTION

This invention relates to fluorescent photosensitive glass compositions and processes for making them. More specifically, this invention relates to silicate or phosphate glasses exhibiting both fluorescent and photosensitive properties. These fluorescent and photosensitive properties are imparted to the glass by the inclusion of certain rare earths in the glass composition.

BACKGROUND OF THE INVENTION

Glass, as a material, has advantageous characteristics for many applications including: isotropy; considerable flexibility as to the shape and size of the finished glass objects; amenability to uniform doping at high concentrations; flexibility in achieving desired physical properties by virtue of the good solubility of the various glass composition constituents; and relatively low production costs.

Generally, glass is obtained by cooling a melt in such a way that crystallization is suppressed. Glass also can be produced by the known sol-gel method.

Most glasses are oxide glasses. The structure of oxide glasses consists of a continuous network of glass-forming oxides in which long range order is missing. Glass-forming oxides such as $SiO_2$, $P_2O_5$, $GeO_2$, $Al_2O_3$, $B_2O_3$ and $Ga_2O_3$ have the strongest bonding strength among glass-forming oxides. Such glass-forming oxides are known as glass network formers. Oxides with weak bonding strength, such as oxides of alkali, alkaline earth, and rare earths cannot form a glass network and are known as modifiers.

Some glasses are fluorescent. Fluorescent glasses, when exposed to ultraviolet light, convert that ultraviolet light into visible light. The fluorescence of rare earth metal ions in glass was first observed in the 1880s (see W. A. Weyl, "The Fluorescence of Glasses", in "Coloured Glasses", Society of Glass Technology, Sheffield, England, 1951). Fluorescent glasses are used in lasers, and the discovery of the lasing phenomenon gave a strong impetus to the development of rare earth activated fluorescent glasses. Various fluorescent glasses and their industrial applications are disclosed in U.S. Pat. Nos. 3,549,554; 3,846,142; 4,075,120 and 4,076,541.

Some glasses are photosensitive. When photosensitive glasses are irradiated with short wave radiation such as ultraviolet radiation or X-rays, the optical properties of the glass in the irradiated areas are modified. Photosensitive glasses generally contain photosensitive elements such as copper (Cu), silver (Ag) and gold (Au). The photosensitive elements in the glass, upon exposure to the incident radiation, absorb that radiation. Upon heat treatment of the glass (typically at or above the annealing point of the glass), metal particles are precipitated thus changing the color of the glass in the irradiated areas. Upon cooling of the glass, the colored areas remain colored unless the glass is subsequently reheated to a high temperature.

Photosensitivity was initially observed by Dalton and described in U.S. Pat. Nos. 2,326,012 and 2,422,472. Development of photosensitive glasses is described in U.S. Pat. No. 2,515,937.

While fluorescent glasses are known in the art, and while photosensitive glasses also are known in the art, it was not previously known to combine fluorescent properties with photosensitive properties in the same glass. Accordingly, it is desirable to provide a glass having both fluorescent and photosensitive properties.

It is also be desirable to be able to control the degree of fluorescence of the glass.

It further is desirable to be able to control the degree of fluorescence of the glass in selected areas of the glass.

It is also desirable to provide a glass having both fluorescent and photosensitive properties for use in photography and fluorescent displays.

It is desirable, moreover, to provide a glass in which the degree of fluorescence can be selectively controlled for use in computer memories.

SUMMARY OF THE INVENTION

The inventive fluorescent photosensitive glass combines the characteristics of two known glass types—fluorescent glasses and photosensitive glasses.

In the inventive glass, the degree of fluorescence can be manipulated via controlled irradiation of the glass. When the glass is irradiated in a specific area, the fluorescence in that area can be inhibited by the photosensitive agents in the glass. The unirradiated areas retain their fluorescence.

It is an object of this invention to provide a glass having both fluorescent and photosensitive properties.

It is also an object of this invention to be able to control the degree of fluorescence of the glass.

It is a further object of this invention to be able to control the degree of fluorescence of the glass in selected areas of the glass.

It is a further object of this invention to provide a glass having both fluorescent and photosensitive properties for use in photography and fluorescent displays.

It is a further object of this invention to provide a glass in which the degree of fluorescence can be selectively controlled for use in computer memories.

In accordance with this invention, glasses are prepared which also include two or more rare earths. In particular, silicate or phosphate glasses are prepared which also include two or more rare earths. One or more of the rare earths imparts fluorescent properties to the glass while the other of the rare earths included in the glass impart photosensitive properties to the glass. Suitable rare earths for imparting fluorescent properties to the glass include ytterbium (Yb), samarium (Sm), europium (Eu) and combinations thereof. Suitable rare earths for imparting photosensitive properties to the glass include erbium (Er), thulium (Tm), praseodymium (Pr), ytterbium (Yb), holmium (Ho), samarium (Sm), cerium (Ce), dysprosium (Dy), terbium (Tb), neodymium (Nd) and combinations thereof.

DETAILED DESCRIPTION OF THE INVENTION

In a preferred embodiment of this invention, silicate or phosphate glasses are prepared which also include two or more rare earths. One or more of the rare earths imparts fluorescent properties to the glass while other of the rare earths included in the glass impart photosensitive properties to the glass.

Suitable base silicate glass compositions comprise about 10 mole percent to about 80 mole percent $SiO_2$, up to about 54 mole percent $K_2O$, up to about 58 mole percent $Na_2O$, up to about 35 mole percent $Li_2O$, up to about 40 mole percent BaO, up to about 40 mole percent SrO, up to about 56 mole percent CaO, up to about 42 mole percent MgO and up to about 48 mole percent ZnO.

Suitable base phosphate glass compositions comprise about 20 mole percent to about 80 mole percent $P_2O_5$, up to about 47 mole percent $K_2O$, up to about 60 mole percent $Na_2O$, up to about 60 mole percent $Li_2O$, up to about 58 mole percent BaO, up to about 56 mole percent SrO, up to about 56 mole percent CaO, up to about 60 mole percent MgO and up to about 64 mole percent ZnO. Additionally, yttrium (Y) may be included in amounts up to about 5 mole percent.

The inventive fluorescent photosensitive glass is made by including two types of rare earths in a silicate or phosphate base glass. These two types of rare earths are (1) fluorescence-imparting rare earths (e.g., ytterbium (Yb), samarium(Sm), europium (Eu)) and (2) rare earth photosensitive agents (e.g., erbium (Er), thulium (Tm), praseodymium (Pr), ytterbium (Yb), holmium (Ho), samarium (Sm), cerium (Ce), dysprosium (Dy), terbium (Tb), neodymium (Nd)). These rare earths may be incorporated in oxide form into the glass in amounts up to about 5 mole percent of the rare earth oxides.

When a specific area of the inventive glass is irradiated at a wavelength sufficient to photoionize the photosensitive rare earth in the glass, fluorescence in that specific area diminishes. Areas which have not been so irradiated continue to exhibit a strong fluorescence.

Without being bound by theory, it is believed that fluorescence is diminished in areas exposed to the photoionizing radiation because the resulting photoionized photosensitive rare earths inhibit the fluorescence in that area.

The present invention is illustrated in greater detail by the following three examples. The invention and the merits thereof are not intended to be limited by the materials, compositions and production procedures described in these examples.

In each of the following three examples, the rare earth oxides were of 99% purity grade. The other glass constituent materials identified were of commercial purity. Fluorescence measurements were conducted using an Amico-Bowman spectrophotofluorometer.

In each of the following three examples, glass discs 12 mm in diameter and 1 mm thick were obtained.

EXAMPLE 1

A silicate glass was prepared using $Na_2CO_3$, $SiO_2$, $CeO_2$ and $Eu_2O_3$ in powder form as raw materials. The powders were weighed and mixed. The resulting mixture was charged to a platinum crucible and melted for 1 hour in air at a temperature of 1500° C. The composition of the resulting glass, in weight percent, was: about 74% $SiO_2$, about 25% $Na_2O$, about 1% $Eu_2O_3$ and about 0.06% $CeO_2$.

A specific area of the resulting glass was irradiated for 200 hours with ultraviolet light using a 125 watt mercury lamp as a source in order to photoionize the Ce in that area. The light wavelength was 314 nm and the flux was 200 mJ/cm$^2$. Excitation of the entire sample was carried out at a wavelength of 535 nm in order to cause the Eu to fluoresce. The maximum fluorescence was at 615 nm. The fluorescence intensity of the area of the glass that had been irradiated at 314 nm was less than 5% of the fluorescence intensity of the remainder of the glass when measured under the same measurement conditions.

EXAMPLE 2

A phosphate glass was prepared in an analogous manner to Example 1. The raw materials used to make the glass were $NaH_2PO_4.2H_2O$, $Eu_2O_3$ and $CeO_2$ in powder form. These raw materials were weighed and mixed in sufficient quantity to yield a glass having the following composition (in mole percent): about 50% $Na_2O$, about 49% $P_2O_5$, about 0.5% $Eu_2O_3$, and about 0.5% $CeO_2$. The mixed raw materials were placed in a high alumina crucible with a lid and heated in air for 3 hours at 1000° C.

A specific area of the resulting glass was irradiated for 200 hours with ultraviolet light using a 125 watt mercury lamp as a source in order to photoionize the Ce in that area. The light wavelength was 314 nm and the fluence was 200 mJ/cm$^2$. Excitation of the entire sample was carried out at a wavelength of 535 nm in order to cause the Eu to fluoresce. The maximum fluorescence was at 612 nm. The fluorescence intensity of the area of the glass that had been irradiated at 314 nm was less than 1% of the fluorescence intensity of the remainder of the glass when measured under the same measurement conditions.

EXAMPLE 3

In order to obtain a glass with the following formula: $2Na_2O.(Y_{0.94}Eu_{0.05}Pr_{0.01})_2O_3.5P_2O_5$, stoichiometric quantities of $Na_2HPO_4.2H_2O$, $Y_2O_3$, $(NH_4)_2HPO_4$, $Pr_6O_{11}$ and $Eu_2O_3$ in powder form were mixed and charged to a platinum crucible. The mixture was slowly heated at 600° C. in air until gas evolution was complete. Then, the mixture was heated in air for 3 hours at 1300° C. The melted mixture was cast in a graphite mold and annealed at 500° C. for 3 hours.

A specific area of the resulting glass was irradiated for 200 hours with ultraviolet light using a 125 watt mercury lamp as a source in order to photoionize the Pr in that area. The light wavelength was 365 nm and the fluence was 200 mJ/cm$^2$. Excitation of the entire sample was carried out at a wavelength of 535 nm in order to cause the Eu to fluoresce. The maximum fluorescence was at 612 nm. The fluorescence intensity of the area of the glass that had been irradiated at 365 nm was less than 1% of the fluorescence intensity of the remainder of the glass when measured under the same measurement conditions.

The best performing glass of the above three examples is that of Example 2. The combination of Ce and Eu in that Example yielded a glass having the greatest difference in fluorescence intensity in areas that have not been exposed to the photoionizing radiation as compared to areas that have been exposed to photoionizing radiation. The fluorescence intensity in the area of the glass that had been exposed to photoionizing radiation was less than 1% of the fluorescence intensity of the remainder of the glass.

The inventive fluorescent photosensitive glasses find use in a variety of applications including photography, fluorescent displays and in computer memories. In any of these applications, it is possible to use a laser beam to supply the requisite radiation to photoionize the photosensitive agent in the glass.

Thus it is seen that fluorescent photosensitive glasses and process for the production thereof are provided. One skilled in the art will appreciate that the present invention can be practiced by other than the described embodiments, which are presented for purposes of illustration and not of limitation, and the present invention is limited only by the claims which follow.

What is claimed is:

1. A fluorescent photosensitive glass comprising a phosphate-based glass comprised of about 20 to 80 mole-percent $P_2O_5$, up to about 47 mole-percent $K_2O$, up to about 60 mole-percent $Na_2O$, up to about 60 mole-percent $Li_2O$, up to about 58 mole-percent BaO, up to about 56 mole-percent SrO, up to about 56 mole-percent CaO, up to about 60 mole-percent MgO, up to about 64 mole-percent ZnO and up to about 5 mole-percent Y, and up to 5 mole-percent of a rare-earth component constituted of oxides of:

a fluorescence-imparting amount of a rare earth element selected from the group consisting of Yb, Sm, Eu and mixtures thereof, and a photosensitivity imparting amount of a rare-earth element selected from the group which consists of Er, Tm, Pr, Yb, Ho, Sm, Ce, Dy, Tb, Nd and mixtures thereof, and wherein a portion of the fluorescent photosensitive glass has been exposed to a photoionizing radiation altering fluorescence of the fluorescent photosensitive glass in a selected region thereof.

2. A fluorescent photosensitive material comprising a glass and up to 5 mole-percent of a rare-earth component constituted of oxides of:

a fluorescene-imparting amount of a rare-earth element selected from the group which consist of Yb, Sm, Eu and mixtures thereof, and a photosensitivity imparting amount of a rare-earth element different from the fluorescene-imparting rare-earth element and selected from the group which consists of Er, Tm, Pr, Yb, Ho, Sm, Ce, Dy, Tb, Nd and mixtures thereof, and wherein a portion of the fluorescent photosensitive material has been exposed to photoionizing radiation altering fluorescence of the material in a selected region thereof.

3. The fluorescent photosensitive material defined in claim 2 wherein said glass is selected from the group which consists of silicate glass and phosphate glass.

4. The fluorescent photosensitive material defined in claim 3 wherein said glass is a silicate glass selected from the group which comprises about 10 mole-percent to about 80 mole-percent $SiO_2$, up to about 58 mole-percent $K_2O$, up to about 58 mole-percent $Na_2O$, up to about 35 mole-percent $Li_2O$, up to about 40 mole-percent BaO, up to about 35 mole-percent SrO, up to about 56 mole-percent CaO, up to about 42 mole-percent MgO and up to about 48 mole-percent ZnO.

5. The fluorescent photosensitive material defined in claim 3 wherein said glass is a phosphate glass containing up to about 5 mole-percent Y.

* * * * *